(12) United States Patent
Sio-Hoi et al.

(10) Patent No.: US 10,440,296 B2
(45) Date of Patent: Oct. 8, 2019

(54) METHOD FOR PROCESSING AN ASYNCHRONOUS SIGNAL

(71) Applicants: UNIVERSITE PIERRE ET MARIE CURIE (PARIS 6), Paris (FR); CENTRE NATIONAL DE LA RECHERCHE SCIENTIFIQUE—CNRS, Paris (FR); INSERM (INSTITUT NATIONAL DE LA SANTE ET DE LA RECHERCHE MEDICALE), Paris (FR)

(72) Inventors: Ieng Sio-Hoi, Montreuil (FR); Benosman Ryad, Pantin (FR); Shi Bertram, Hong Kong (CN)

(73) Assignees: UNIVERSITE PIERRE ET MARIE CURIE (PARIS 6), Paris (FR); CENTRE NATIONAL DE LA RECHERCHE SCIENTIFIQUE (CNRS), Paris (FR); INSERM (INSTITUT NATIONAL DE LA SANTE ET DE LA RECHERCHE MEDICALE), Paris (FR)

( * ) Notice: Subject to any disclaimer, the term of this patent is extended or adjusted under 35 U.S.C. 154(b) by 0 days.

(21) Appl. No.: 15/556,632

(22) PCT Filed: Mar. 15, 2016

(86) PCT No.: PCT/FR2016/050574
§ 371 (c)(1),
(2) Date: Sep. 8, 2017

(87) PCT Pub. No.: WO2016/146937
PCT Pub. Date: Sep. 22, 2016

(65) Prior Publication Data
US 2018/0063449 A1    Mar. 1, 2018

(30) Foreign Application Priority Data

Mar. 16, 2015  (FR) ..................... 15 52155

(51) Int. Cl.
*H04N 5/345* (2011.01)
*G06K 9/00* (2006.01)
(Continued)

(52) U.S. Cl.
CPC ........... *H04N 5/345* (2013.01); *G06K 9/0053* (2013.01); *G06K 9/00255* (2013.01);
(Continued)

(58) Field of Classification Search
CPC .............. G06K 9/209; G06K 9/00771; G06K 9/00496; G06K 9/0053; H04N 5/345
See application file for complete search history.

(56) References Cited

U.S. PATENT DOCUMENTS

2014/0326854 A1* 11/2014 Delbruck ............... H04N 5/378
250/204

OTHER PUBLICATIONS

Zhenjiang Ni, et al., Asynchronous Event-Based Visual Shape Tracking for Stable Haptic Feedback in Microrobotics, IEEE Transactions on Robotics, Oct. 2012, pp. 1081-1089, vol. 28, No. 5.
(Continued)

Primary Examiner — Ahmed A Berhan
(74) Attorney, Agent, or Firm — Young & Thompson

(57) ABSTRACT

Disclosed is a method for processing an asynchronous signal produced by a light sensor, the sensor having a pixel matrix disposed opposite a scene, the method including: receiving from the light sensor the asynchronous signal including, for each pixel of the matrix, successive events from the pixel; analysing the asynchronous signal using activity profiles as events are received in the asynchronous signal. The activity profile includes at least, for each pixel of the sensor, an activity value that decreases as a function of the time that has passed since the most recent event among the successive events from the pixel.

20 Claims, 13 Drawing Sheets

(51) Int. Cl.
G06K 9/20 (2006.01)
G06K 9/62 (2006.01)

(52) U.S. Cl.
CPC ......... *G06K 9/00496* (2013.01); *G06K 9/209* (2013.01); *G06K 9/6212* (2013.01); *G06K 2209/21* (2013.01)

(56) References Cited

OTHER PUBLICATIONS

S. Schraml, et al., A Real-time Pedestrian Classification Method for Event-based Dynamic Stereo Vision, IEEE Computer Society Conference on Computer Vision and Pattern Recognition—Workshops, Jun. 13-18, 2010, pp. 93-99.

Georg Wiesmann, et al., Event-driven Embodied System for Feature Extraction and Object Recognition in Robotics Applications, IEEE Computer Society Conference on Computer Vision and Pattern Recognition—Workshops, Jun. 16-21, 2012, pp. 76-82.

Garrick Orchard, et al., HFirst: A Temporal Approach to Object Recognition, IEEE Transactions on Pattern Analysis and Machine Intelligence, Oct. 2015, pp. 2028-2040, vol. 37, No. 10.

Tobi Delbrück, et al., Activity-Driven, Event-Based Vision Sensors, Proceedings of IEEE International Symposium on Circuits and Systems, May 30-Jun. 2, 2010, pp. 2426-2429.

Dana H. Ballard, et al., Dynamic coding of signed quantities in cortical feedback circuits, Frontiers in Psychology, Aug. 2012, pp. 1-13, vol. 3, Article 254.

\* cited by examiner

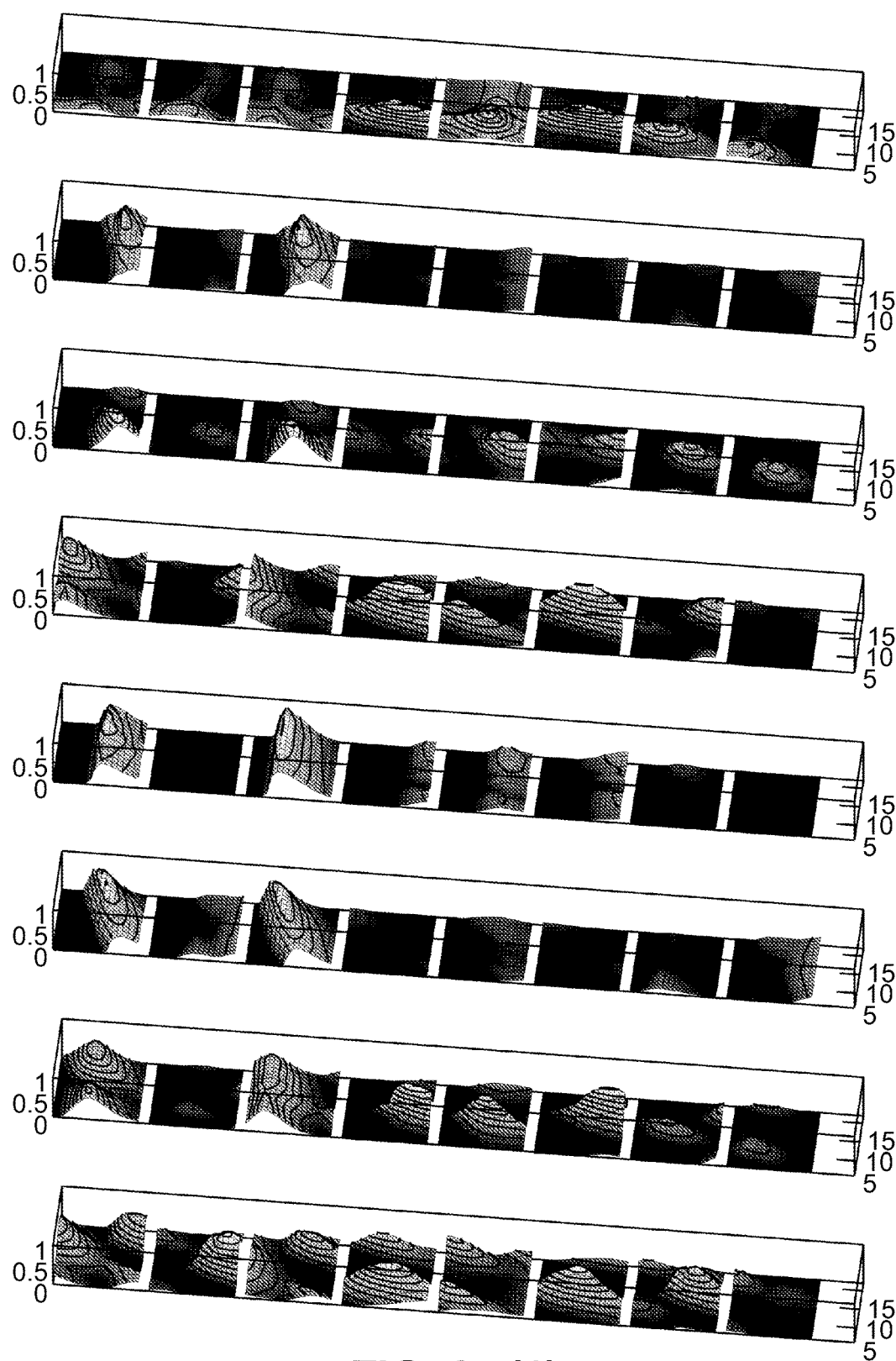
FIG. 6c (1)

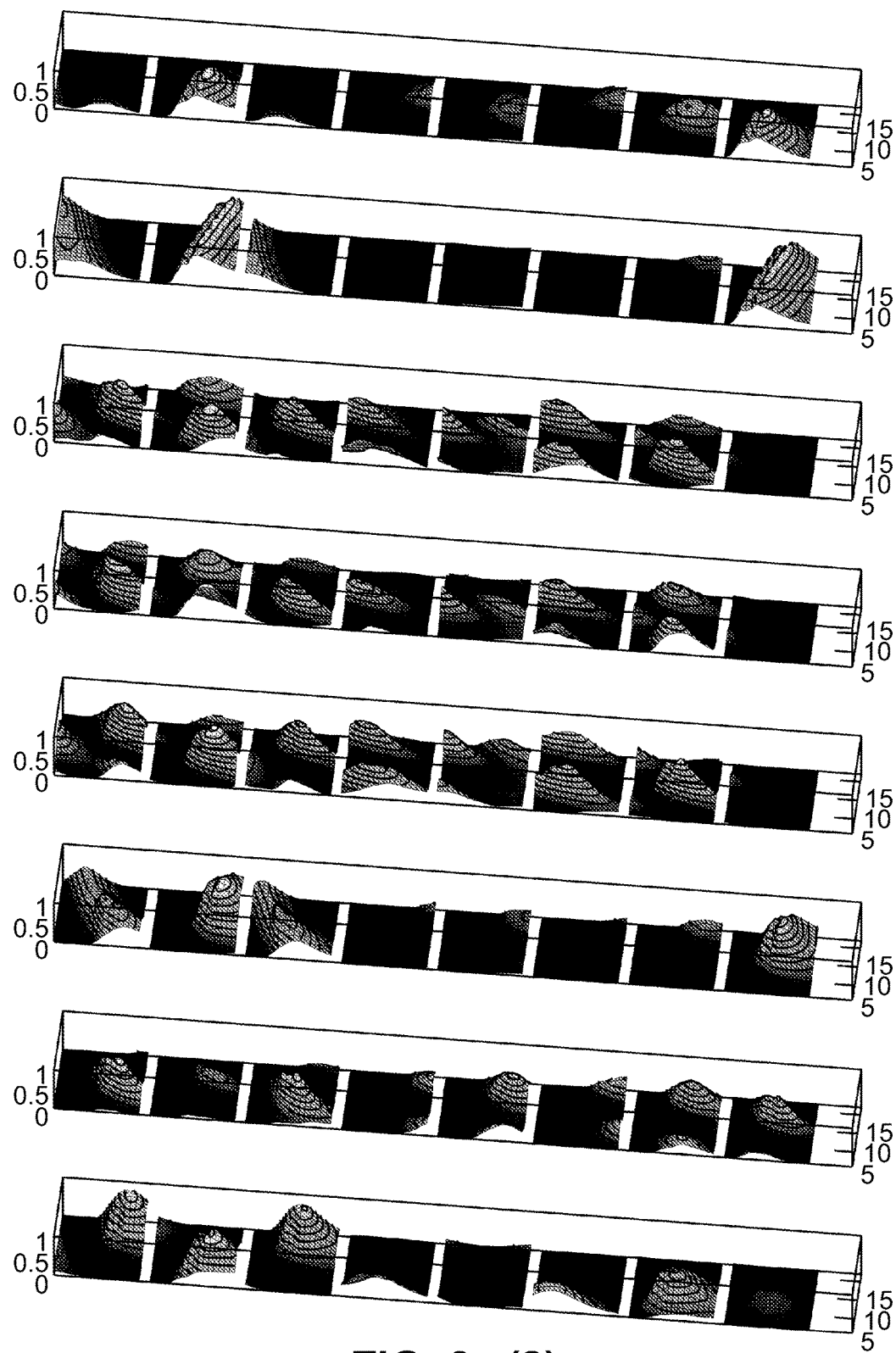
FIG. 6c (2)

(a)

| | | | | | | | |
|---|---|---|---|---|---|---|---|
| | 11 | | 1 | 16 | | | 3 |
| | | 5 | | | | | 3 |
| | | 1 | | | | | 1 |
| | 6 | 6 | 9 | 3 | 1 | | 5 |
| | 2 | 5 | 9 | | 10 | | 6 |
| | | | | | | 19 | |
| | | 2 | | | 8 | | 1 |

← 807

(b)

| | | | | | | | |
|---|---|---|---|---|---|---|---|
| | 14 | 2 | 4 | | | | |
| | | 15 | 2 | 1 | 1 | | 1 |
| | | | 9 | 2 | | | |
| | 3 | | | 14 | | | |
| | | | 1 | | 16 | | |
| | 2 | 2 | 1 | 2 | 2 | 19 | 1 |
| | | | 2 | | | | 17 |

← 808

(c)

| | | | | | | | |
|---|---|---|---|---|---|---|---|
| | 14 | | | | | | |
| | | 17 | | | 2 | | 2 |
| | | | 1 | 13 | 4 | | |
| | 3 | | 4 | 13 | 1 | | |
| | | | | | 16 | | 4 |
| | 2 | 1 | 2 | 2 | | 19 | |
| | | | | | | | 13 |

METHOD FOR PROCESSING AN ASYNCHRONOUS SIGNAL

This invention relates to the field of asynchronous signal processing, in particular for the detection of shapes in this signal.

Various video signal processing techniques have been developed historically. They are generally based on the conventional raster image approach.

There are asynchronous sensors (DVS, ATIS). These sensors can advantageous replace conventional cameras.

But the processing of the signal is less intuitive than in the world of raster image cameras. Although certain algorithms have been developed to process certain families of problems (e.g. optical flow, shape tracking), other problems remain little or not explored or the resolving thereof is more delicate.

This is in particular the case for shape recognition.

In order to detect shapes and/or movements, the current methods (i.e. that use video data from conventional cameras) seek to identify certain visual characteristics that are proper to a set of pixels located in the vicinity in the video data in question.

These visual characteristics are most often apprehended by those skilled in the art as space information of an image (even if this space information can be in movement).

Then, the video data time information is often neglected: at most, a variation/change in a visual characteristic can be sought between two or more images (or frames) of video data.

Neglecting the time component can be explained primarily by the usual video acquisition technology: video data is the fruit of an acquisition producing a large number of static images (or frames).

This video acquisition technology has historically conditioned the way in which videos are processed or displayed. The existence of this succession of static images makes the time (or dynamic) information of the video data difficult to manipulate.

Although it is possible to increase the number of images per second of video data, it is rare for the frequency of these images to exceed 100 Hz, whether for reasons concerning hardware limits in terms of acquisition or for reasons of real-time processing of this data with conventional tools for shape detection.

There is as such a need for the detection of reliable shapes and that can be used by making best use of the time information of the video data.

This invention as such improves the situation.

Contrary to conventional cameras that record successive images at regular sampling instants, biological retinas inspired from the operation of the human eye have been developed. Biological retinas transmit only very little redundant information on the scene to be viewed, and this asynchronously.

Event-driven asynchronous vision sensors deliver compressed digital data in the form of events.

A presentation of such sensors can be consulted in "*Activity-Driven, Event-Based Vision Sensors*", T. Delbrück, and al., Proceedings of 2010 IEEE International Symposium on Circuits and Systems (ISCAS), pp. 2426-2429. Event-based vision sensors have the advantage of removing the redundancy, reducing lag times and increasing the dynamic range with respect to conventional cameras.

The output of such a vision sensor can consist, for each pixel address, of a sequence of asynchronous events that represent changes in reflectance of the scene at the time they occur.

Each pixel of the sensor is independent and detects changes in intensity that are greater than a threshold since the emission of the last event (for example a contrast of 15% over the logarithm of the intensity). When the change in intensity exceeds the threshold set, an ON or OFF event is generated by the pixel according to whether the intensity is increasing or decreasing (DVS sensors). Certain asynchronous sensors associate the detected events with measurements of light intensity (ATIS sensors).

As the sensor is not sampled on a clock as is a conventional camera, it can take account of the sequencing of events with great time precision (for example, of about 1 µs). If such a sensor is used to reconstruct a sequence of images, an image rate of several kilohertz can be achieved, compared to a few dozens of hertz for conventional cameras.

The great time precision of these cameras can make it possible to make the best use of the time information of a video.

However, processing events from these sensors can be complex, because the events are punctual concepts in time (t) and in space (x,y). As such, the processing thereof and the analysis thereof can be difficult.

There is therefore a need to create simple instruments that can be manipulated in order to conduct a pertinent analysis of a signal coming from an asynchronous sensor.

The analysis must in particular include the space dimensions and the time dimension in order to facilitate the identification of the space-time characteristics in the extremely numerous events that such a sensor delivers, without losing the dynamics of the latter.

To this effect, this invention proposes a method for processing an asynchronous signal produced by a light sensor, the sensor having a pixel matrix disposed opposite a scene, the method comprising:
  receiving from the light sensor the asynchronous signal comprising, for each pixel of the matrix, successive events from said pixel;
  analysing the asynchronous signal using activity profiles as events are received in the asynchronous signal.

The activity profile comprises at least, for each pixel of the sensor, an activity value that decreases as a function of the time that has passed since the most recent event among the successive events from said pixel.

The "activity profile" of a pixel can be seen as a curve as a function of time of which the value represents, at least, the time of the last event received for this pixel (possibly filtered over a given polarity).

The activity profiles established as such form analysis tools that summarise the appearance of events by locally retaining their space-time structure.

It has been observed that the morphology of the activity profiles denotes the presence of certain basic forms in the scene observed by the sensor.

These profiles change as asynchronous events are received and therefore retain the dynamics of the sensor.

The set of activity profiles forms what can be called a "freshness card" of the sensor.

Many signal processing applications can be developed with the analysis using activity profiles. In a non-limiting way, it is possible to use them for:
  shape recognition: reference is made to a library of typical profiles that translates predefined movements of predefined basic shapes. If the analysis detects an activity profile similar to a typical profile of the library, shape recognition takes place and an indication of the speed of travel of this shape is estimated;

estimation of movement in the scene: if an activity profile is detected a first time then shortly after (or a very similar activity profile) in a nearby region, an estimation of the speed of travel of an object in the field of vision of the sensor can be determined;

estimation of depth in an image (stereo): if the same (or similar) activity profile is detected in two images coming from two sensors capturing the same scene, it is possible to consider that the pixels associated with the activity profiles correspond to the same point of the captured scene and as such determine the depth of this point;

etc.

The "asynchronous signal" can be the set of events coming from a given retinal sensor or a subset of these events (space subset: limited to certain pixels only; or/and time subset: limited to a given period of time).

Furthermore, the activity profile can decrease exponentially according to the time that has passed since the most recent event among the successive events from said pixel.

This exponential decrease can make it possible to detect the last events received by the sensor better.

In a particular embodiment, the activity profile can furthermore be a function of the time that has passed since an event prior to the most recent event among the successive events from said pixel.

It is even possible to take account of all of the events received for this pixel in order to determine the associated activity profile.

This invention also proposes a method for recognising shapes that is specially suited for retinal sensors, and using the processing of the previously-presented asynchronous signal.

This invention can also relate to a method for recognising shapes comprising:
/a/ the execution of the method for processing a previously-presented asynchronous signal;
/b/ as events are received, for each current pixel of said sensor:
  /b1/ determination of a context for said current pixel, said context being defined as a set of activity profiles of pixels located less than a predetermined distance from said current pixel,
  /b2/ determination of a typical context from a set of predetermined typical contexts, with the typical context determined having, from the set of typical contexts, a minimum distance to the context determined in the step /b1/,
/c/ determination of a signature according to a number of occurrences of the determination of the typical contexts in the step /b2/,
/d/ determination of a shape via a comparison of said signature with a base of typical signatures.

The distances can be distances in mathematical terms. As such, the distances can be Euclidean distances, Manhattan distances, Minkoswski distances, Tchebychev distances or any other distances.

Most often, it is possible to represent a "context" as a surface in a three-dimensional space (two axes representing the coordinates of the pixels and one axis without a dimension (as a function of time)).

This context makes it possible to spatially and temporally apprehend the near environment of the event considered (i.e. current). A context can be viewed as a set of values associated with pixel coordinates located at less than a predetermined distance from a pixel from which the current event comes (called the "current pixel"), with respect to the current pixel.

Most often, it is possible to represent a "set of components" graphically as a "histogram". The terminology "histogram" or "signature" is also used in the rest of the description.

In another embodiment, it is possible to take a hierarchical model into account for the typical contexts used.

This invention can as such relate to a method for recognising shapes that comprises (with a hierarchical model of typical contexts being defined, each typical context being associated with a plurality of levels of the hierarchical model):
/a/ usage of events of the asynchronous signal of the sensor as current events and usage of typical contexts of the first level of the hierarchical model as current typical contexts;
/b/ execution of the method for processing an asynchronous signal as indicated hereinabove with the current events;
/c/ as current events are received, for each current pixel of said sensor:
  /c1/ determination of a context for said current pixel, with the said context being defined as a set of activity profiles used in the step /b/ for pixels located less than a predetermined distance from said current pixel,
  /c2/ determination of a typical context ($C_k$) from the current typical contexts (504), with the determined typical context having, among all of the current typical contexts, a minimum distance to the context determined in the step /c1/,
  /c3/ generation of an event as a function of the typical context identified in the step /c2/,
/d/ if a level of the hierarchical model has not been used:
  usage of the events generated in the step /c3/ as current events,
  usage of the typical contexts of a level of the hierarchical model not yet used as current typical contexts; re-execution of the steps /b/ to /e/;
/e/ if all of the levels of the hierarchical model have been used:
  determination (521) of a signature as a function of a number of occurrences of determination of typical contexts at the last occurrence of the step /c2/;
  determination (524) of a shape through a comparison of said signature with a base of typical signatures.

These hierarchical levels make it possible to proceed with a step-by-step recognition: the first hierarchical level makes it possible to identify very basic shapes, with the hierarchical levels of a higher order making it possible to identify more complex shapes using the lower levels.

In a particular embodiment, the determining of a context takes into account, separately, the events that have different polarities.

For example, the polarity can correspond to the fact that a pixel intensity can vary (e.g. +1 in the case of an increase or −1 in case of a decrease). The polarity can also correspond to the typical context identified for the immediately lower hierarchical level.

Taking events that have different polarities into account separately makes it possible to increase the pertinence of the contexts determined.

In this case, a context can be seen as a set of values associated:

with coordinates of pixels located at less than a predetermined distance from a "current pixel", with respect to the current pixel; and
with a given polarity.

Advantageously, the distance used in the step /e/ is a Bhattacharyya distance or a standardised distance.

A computer program, implementing all or a portion of the method described hereinabove, installed on pre-existing equipment, is in itself advantageous.

As such, this invention also relates to a computer program comprising instructions for the implementation of the method described hereinabove, when this program is executed by a processor.

This program can use any programming language (for example, an object-oriented language or other), and by in the form of an interpretable source code, a partially compiled code or an entirely compiled code.

FIG. 5 described hereinafter can form the flow chart of the general algorithm of such a computer program.

Other characteristics and advantages of the invention shall further appear when reading the following description. The latter is purely illustrative and must be read in conjunction with the annexed drawings wherein:

FIGS. 6a to 6c are examples of typical contexts in a possible embodiment of the invention;

FIGS. 8a to 8c are performance examples of detecting shapes for various shapes to be recognised.

FIG. 1 shows the principle of the ATIS.

Figure 1:
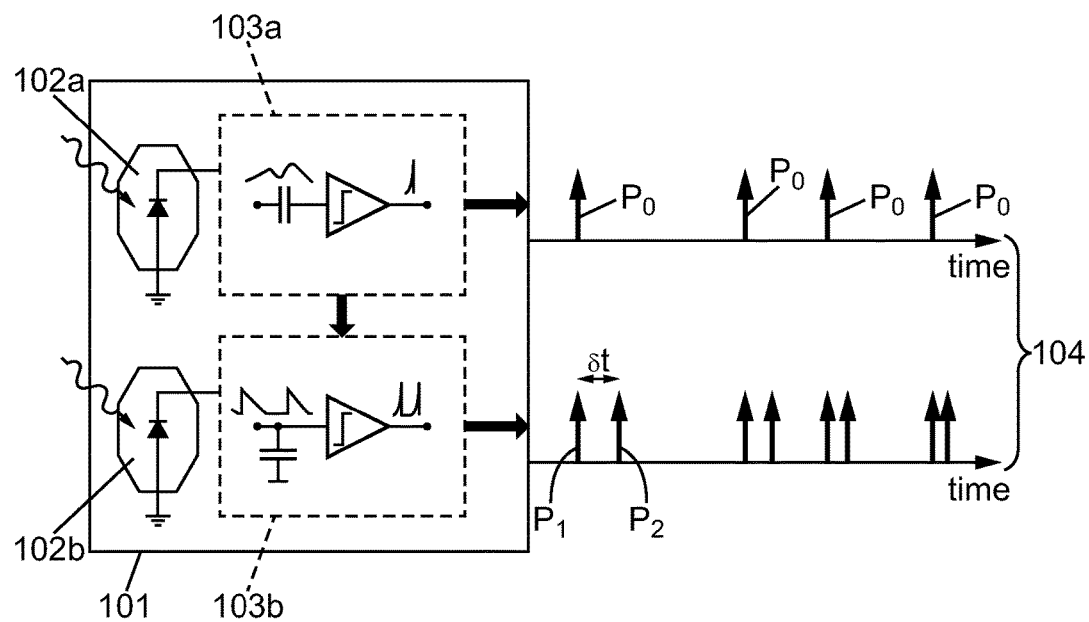
FIG. 1 is a synoptic diagram of an asynchronous light sensor of the ATIS type.

A pixel 101 of the matrix that forms the sensor comprises two photosensitive elements 102a, 102b, such as photodiodes, respectively associated with electronic detection circuits 103a, 103b.

The sensor 102a and its circuit 103a produce a pulse $P_0$ when the light intensity received by the photodiode 102a varies by a predefined quantity.

The pulse $P_0$ that marks this change in intensity triggers the electronic circuit 103b associated with the other photodiode 102b. This circuit 103b then generates a first pulse $P_1$ then a second pulse $P_2$ as soon as a given quantity of light (number of photons) is received by the photodiode 102b.

The time difference $\delta t$ between the pulses $P_1$ and $P_2$ is inversely proportional to the light intensity received by the pixel 101 just after the appearance of the pulse $P_0$.

The asynchronous information from the ATIS comprises two pulse trains combined for each pixel (104): the first pulse train $P_0$ indicates the instants where the light intensity has changed beyond the detection threshold, while the second train is composed of pulses $P_1$ and $P_2$ of which the time difference $\delta t$ indicates the corresponding light intensities, or levels of grey.

An event e(p, t) from a pixel 101 of position p of the matrix of the ATIS then comprises two types of information: a time information given by the position of the pulse $P_0$, giving the instant t of the event, and grey-scale information given by the time difference $\delta t$ between the pulses $P_1$ and $P_2$.

Figure 2:
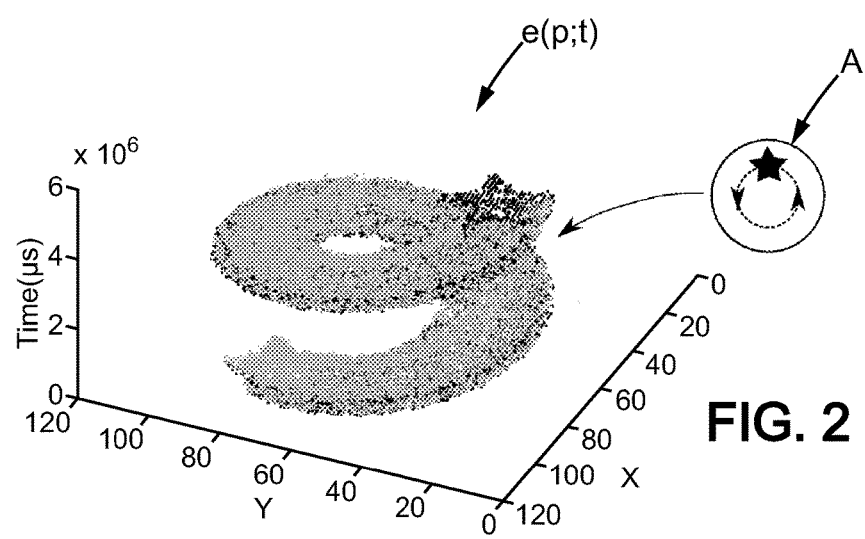
FIG. 2 is a diagram that shows events generated by an asynchronous sensor placed opposite a scene that comprises a rotating star.

The events coming from pixels can then be placed in a three-dimensional space-time representation such as that shown in FIG. 2. In this figure, each point p marks an event e(p, t) generated asynchronously at an instant t at the level of a pixel p of the sensor, of position $$\begin{pmatrix} x \\ y \end{pmatrix},$$

by the movement of a star rotating at a constant angular speed as diagrammed in box A. Most of these points are distributed in the vicinity of a surface with a generally helical shape. Furthermore, the figure shows a certain number of events at a distance from the helical surface which are measured without corresponding to the effective movement of the star. These events are acquisition noise.

The events e(p, t) can then be defined by all of the following information:

$$e(p, t) = \begin{cases} p \in C \subset \mathbb{R}^2 \\ pol \\ I(p, t) \end{cases}$$

with C the space domain of the sensor, pol the polarity representing the direction of the change in the luminance (ex. 1 for an increase or −1 for a decrease) and I(p, t) the light intensity signal of the point p.

The light intensity signal can as such be the set of combined pulse trains 104 such as described in FIG. 1. If $t_u$ represents the tile of occurrence of the event, and the difference between $t_{e+,u}$ and $t_{e-,u}$ represents a value that is inversely proportional to the variation of intensity, it is possible to encode the intensity using three Dirac $\delta$ in such a way that $I(p, t) = \delta(t-t_u) + \delta(t-t_{e+,u}) + \delta(t-t_{e-,u})$. The intensity signal of the pixel located at the coordinate p then makes it possible to temporally encode the luminance information.

It is possible to note the $i^{th}$ event of a sensor as ev(i), with ev(i) then being defined by all of the following information:

$$ev(i) = \begin{cases} p_i \in C \subset \mathbb{R}^2 \\ pol_i \\ t_i \\ I_i(p_i, t_i) \end{cases}$$

with C the space domain of the sensor, $p_i$ the point of the sensor concerned by the $i^{th}$ event, $pol_i$ with the polarity representing a type of events (for example, the direction of the change in luminance for the $i^{th}$ event, e.g. 1 for an increase or −1 for a decrease), $t_i$ the time of occurrence of the $i^{th}$ event and $I_i(p, t)$ the light intensity signal of the point $p_i$ (if this value is available).

In order to manipulate the events in a simpler manner, it is possible to define for each pixel p and for each polarity pol a function S that represents a "freshness" of the events, S(p,pol) being a function of at least the time t of occurrence of the last event for this pixel and having this polarity pol.

It is possible to define the function S as the sum, for each event $$ev_p(i) = \begin{cases} p_i = p \\ pol_i = pol \\ t_p \end{cases}$$

of a given pixel p and for a given polarity pol, at a given instant t, of the primitive function $$S_{prim}(p, pol, t) = \begin{cases} \max(h + \theta.(t_p - t), 0) \, si \, t \geq t_p \\ 0 \, sinon \end{cases},$$

h being a predetermined value and θ being a predetermined factor that corresponds to the speed of the decrease of the primitive function.

The "sum" of the primitive function can also be seen mathematically as a convolution:
of the primitive function $$S_{prim}(p, t) = \begin{cases} \max(h - \theta.t, 0) \, si \, t \geq 0 \\ 0 \, sinon \end{cases}$$

(or more generally of any decreasing function),
with a signal comprising a Dirac for each time $t_p$ at which an event $$ev_p(i) = \begin{cases} p_i = p \\ pol_i = pol \\ t_p \end{cases}$$

has occurred.

Figure 3A:
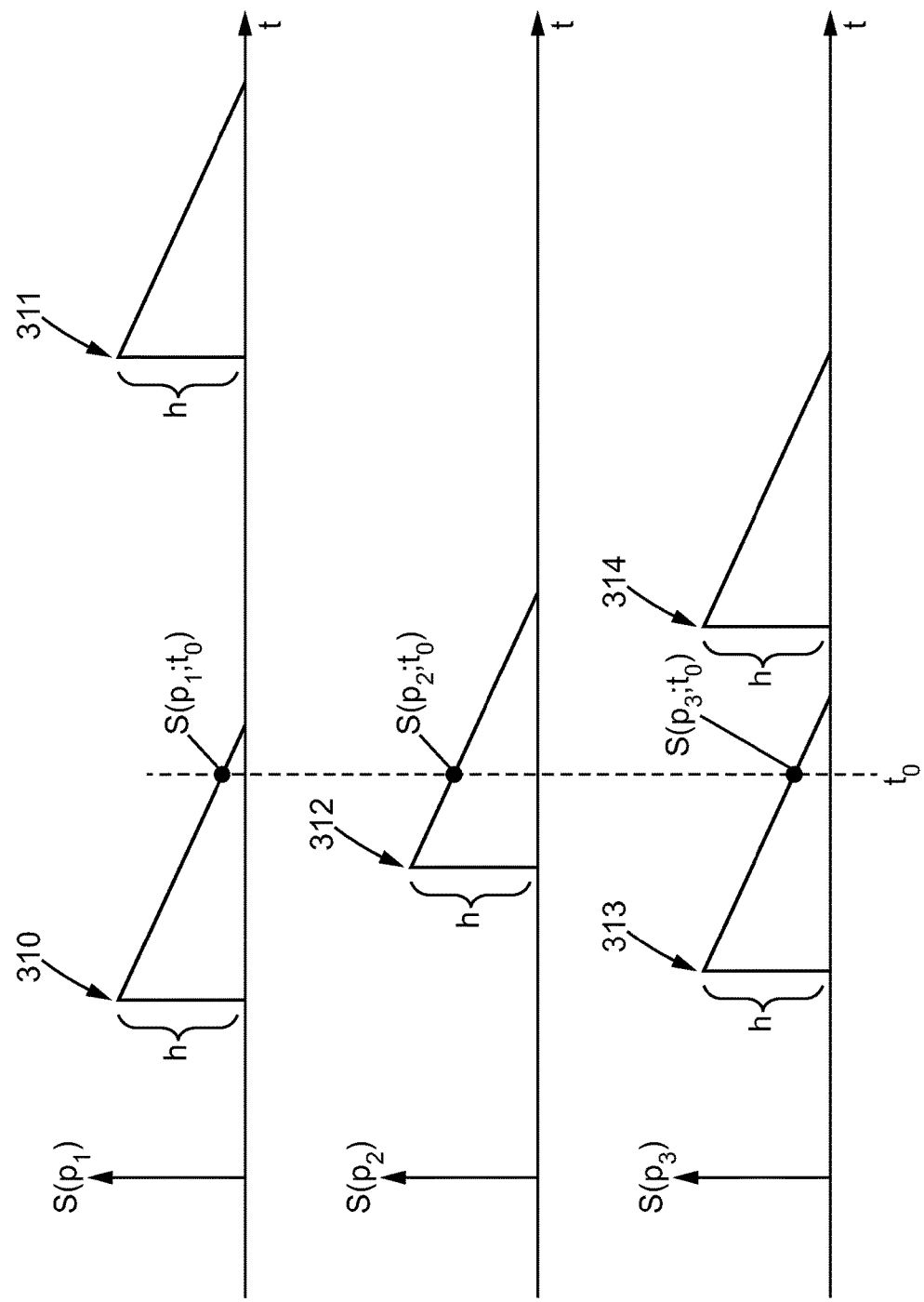
FIGS. 3a and 3b are embodiments of an "activity signal" for the events of a given pixel.

For the purposes of illustration, FIG. 3a shows three possible activity signals t→S, for three pixels $p_1$, $p_2$ and $p_3$ of the sensor (and for a given polarity value pol).

In the absence of events, the value of $S(p_1, t)$, $S(p_2, t)$ or $S(p_3, t)$ is zero. However, during the occurrence of a polarity event pol (for example, 310) on pixel $p_1$, $S(p_1, t)$ takes a predetermined threshold value (here h, with this value h able to be unitary).

The value of the activity signal $S(p_1, t)$ then decreases progressively after this event to move towards 0.

The same applies for the event 311 for the pixel $p_1$, for the event 312 for the pixel $p_2$, or for the event 313/314 for the pixel $p_3$, If the decrease of the activity signal S is here linear, it is possible to provide any type of decrease such as an exponential decrease:

$$h.e^{-\frac{t-t_p}{\tau}}$$

Figure 3B:
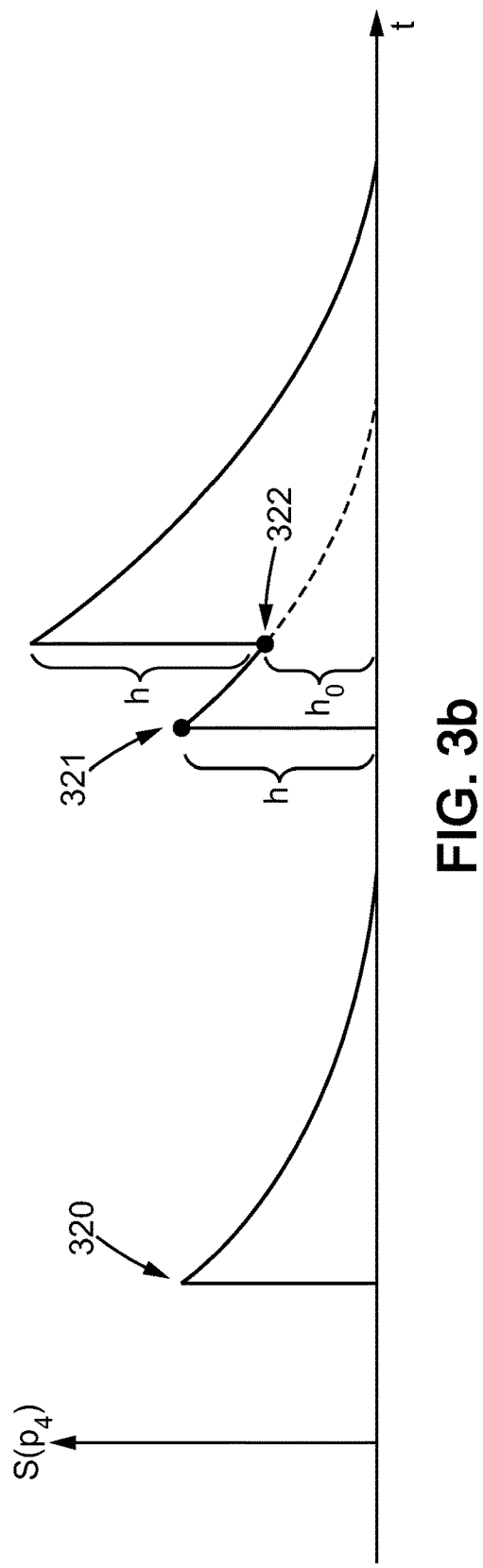

This exponential decrease can be illustrated by FIG. 3b (see the curve 3b and the event 320).

Moreover, it is possible that, during the occurrence of an event for the pixel considered (e.g. $p_4$ here), the value of the function S is not negligible with respect to the value of h (e.g. the event 321 is temporally close to the event 322).

In an embodiment, during the occurrence of the subsequent event 322, the value of the activity signal S can be set to the sum (possibly weighted) of the current value of S immediately before the event 322 (i.e. $h_0$) and of h. As such, the decrease of the curve S will start from the value $h+h_0$ as shown in FIG. 3b. Moreover, it is possible to provide that the value of $h+h_0$ be capped at a predetermined value h1 (i.e. $\min(h_1, h+h_0)$)

In another embodiment, during the occurrence of the subsequent event 322, the value of the curve S is set to the value h regardless of the value of $h_0$ (i.e. the events prior to the last event (i.e. the subsequent event) are ignored). In this other embodiment, it is possible to define a time referred to as "time of the last event" defined as follows:

$$T(p,pol,i) = \max(t_j)|j<i$$

or $$T(p,pol,t) = \max(t_j)|t_j<t$$

with $t_j$ the times of events occurring for the pixel for a pixel p with the polarity pol.

Conceptually, p→T(p,pol, t) defined a card of the times of the last event of the same polarity occurring temporally just before a reference time (i.e. t).

It is then possible to define, in this other embodiment, p→S(p,pol, t) as being a function of this set of times T(p,pol, t).

For example, p→S(p,pol, t):

$$p \to S(p, pol, t): \begin{cases} h.e^{-\frac{t-T(p,pol,t)}{\tau}} \, si \, t \geq T(p, pol, t) \\ 0 \, sinon \end{cases}$$

with τ and h a predetermined time constant (S can be any decreasing function with the time t over an interval comprising as a lower limit T(p,pol, t)).

The creation of a card S of pixels that represent the "freshness" of events of these pixels is advantageous, as it allows for a continuous and simple representation of discontinuous concepts (i.e. the events). This created card makes it possible to transform the representation of the events in a simple apprehension domain.

Then, the creation thereof simplifies the manipulation and the comparison of events.

Figure 3C:
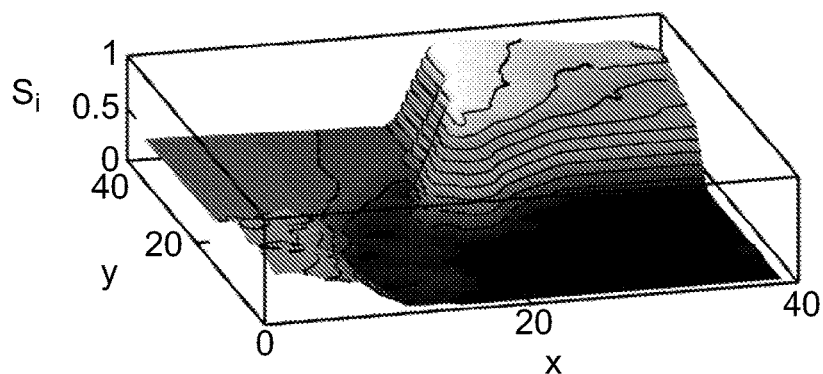
FIG. 3c is an example of a 3D surface that represents a given "freshness" card according to an embodiment of the invention.

Once the pixel card p→S(p,pol, t) is determined, it is possible to create a 3D graph of the amplitude of S according to the coordinates p, for a time t and for a fixed value of polarity pol (see FIG. 3c).

Of course, S can include N sets of separated values (i.e. (p,pol)→S(p,pol, t), one for each possible polarity value pol (if there are N possible polarity values).

$S_p$ is called the "context" of the pixel p the set of the values of (q, pol)→S(q, pol, t) for the pixels q in the vicinity of the pixel p (i.e. located at a predetermined distance of the pixel p, e.g. distance in mathematical terms, for example in a square of side 2R+1 centred on the pixel p). In order to visually represent the context (comprising several possible polarity values), it is possible to juxtapose several representations of q→S(q, pol, t) for the various possible values of pol.

Figure 3D:
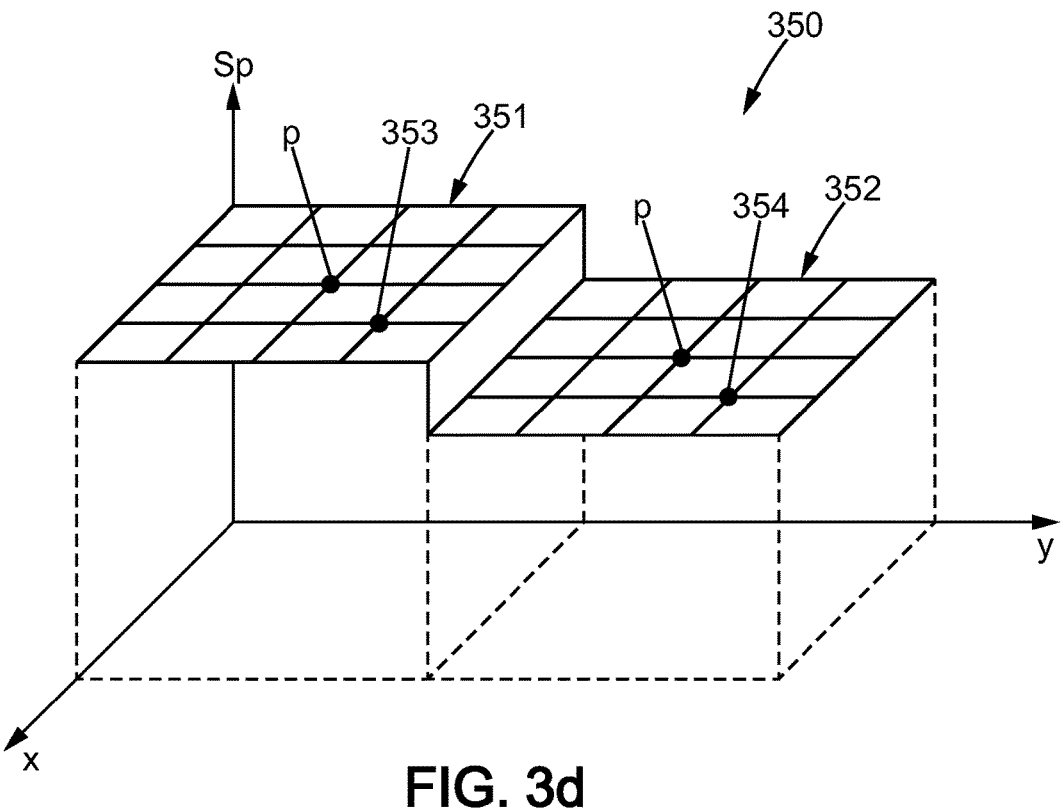
FIG. 3d is an example of a 3D surface that represents a context according to an embodiment of the invention.

For example, FIG. 3d can represent the "context" 350 of the pixel p: the plateau 351 the represents a value of the function q→S(q, 1, t) and the plateau 352 represents a value of the function q→S(q, −1, t) (of course, the plateaus can have any shapes, the choice of the plateau simply making it possible to facilitate viewing). Likewise, the point 353 and 354 correspond to a value of the function S for the same pixel but for a different polarity.

It is possible to define a context $S_p$ for any pixel p.

In order to be able to characterise the various contexts possible, it is possible to define contexts referred to as "typical".

These typical contexts can be predetermined or can be determined based on the algorithm provided by the document D. Ballard and J. Jehee, "*Dynamic coding of signed quantities in cortical feedback circuits*" Frontiers in Psychology, vol. 3 no. 254, 2012 or by using another method (method of the "k-means" for example).

For each context $S_p$ identified for a pixel p, it is possible to associate to the pixel p a typical context that corresponds to the typical context that is closest to $S_p$. The distance between the context $S_p$ and a typical context can be, for example, determined by calculating a sum of Euclidean distances between the values of the context $S_p$ and of the typical context for the same pixels p and same polarities pol. The distance can also be a function of the sum of the squared Euclidean distances.

If the distance calculated is above a certain predetermined threshold, it is possible to not associate any typical context to the pixel p.

These typical contexts $\{C_k\}$ are defined over a limited space domain as mentioned hereinabove for the contexts $S_p$ (e.g. on squares of side 2R+1).

It is also possible to define several hierarchical levels of typical contexts, with each hierarchical level m defining a plurality of typical contexts $\{C_{k\_m}\}$. The interest of such hierarchical levels is detailed with regards to the description of FIG. 5.

Figure 6A:
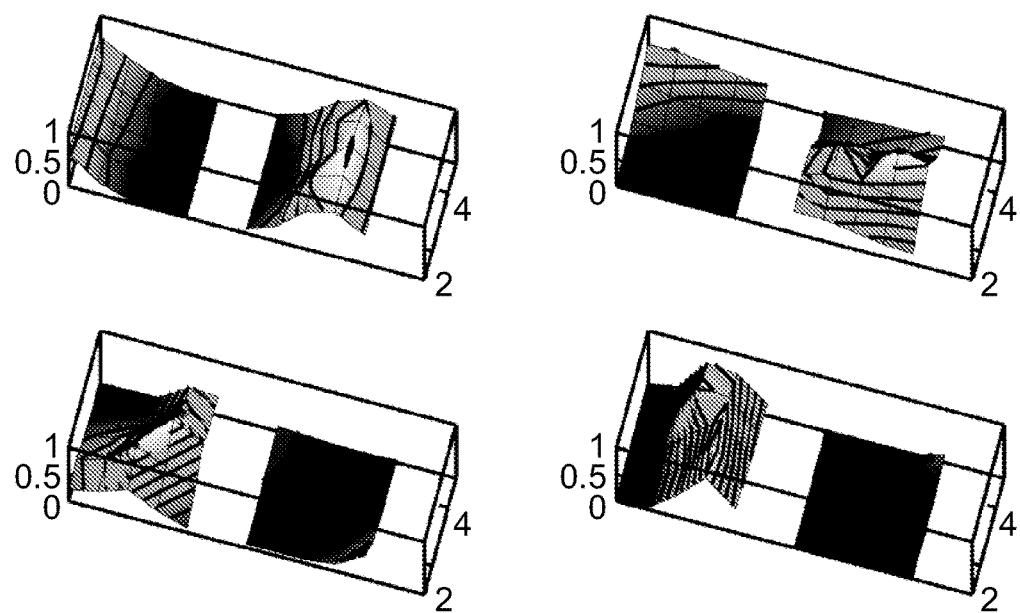

For the purposes of illustration, FIG. 6a shows a first hierarchical level of possible typical contexts (i.e. size 5×5 pixels for a polarity of 1 (left zone of each one of the typical contexts) or for a polarity of −1 (right zone of each one of the typical contexts)).

In addition, at a given instant t, and after identification of the typical contexts $\{C_k\}$ (or more generally $\{C_{k\_m}\}$ for a fixed hierarchical level m) associated with each pixel p, it is possible to calculate a number of occurrences of each one of the typical contexts for all of the possible pixels p.

These calculated number of occurrences make it possible to create signatures/histograms $\mathcal{H}$ that characterise the stream of events (as ordinates, the number of occurrences, as abscissa, the index of the typical context identified).

Characterising the stream of events that allows for shape recognition can also use other methods such as Echo-State Networks or recurring Neural Networks.

Figure 4:
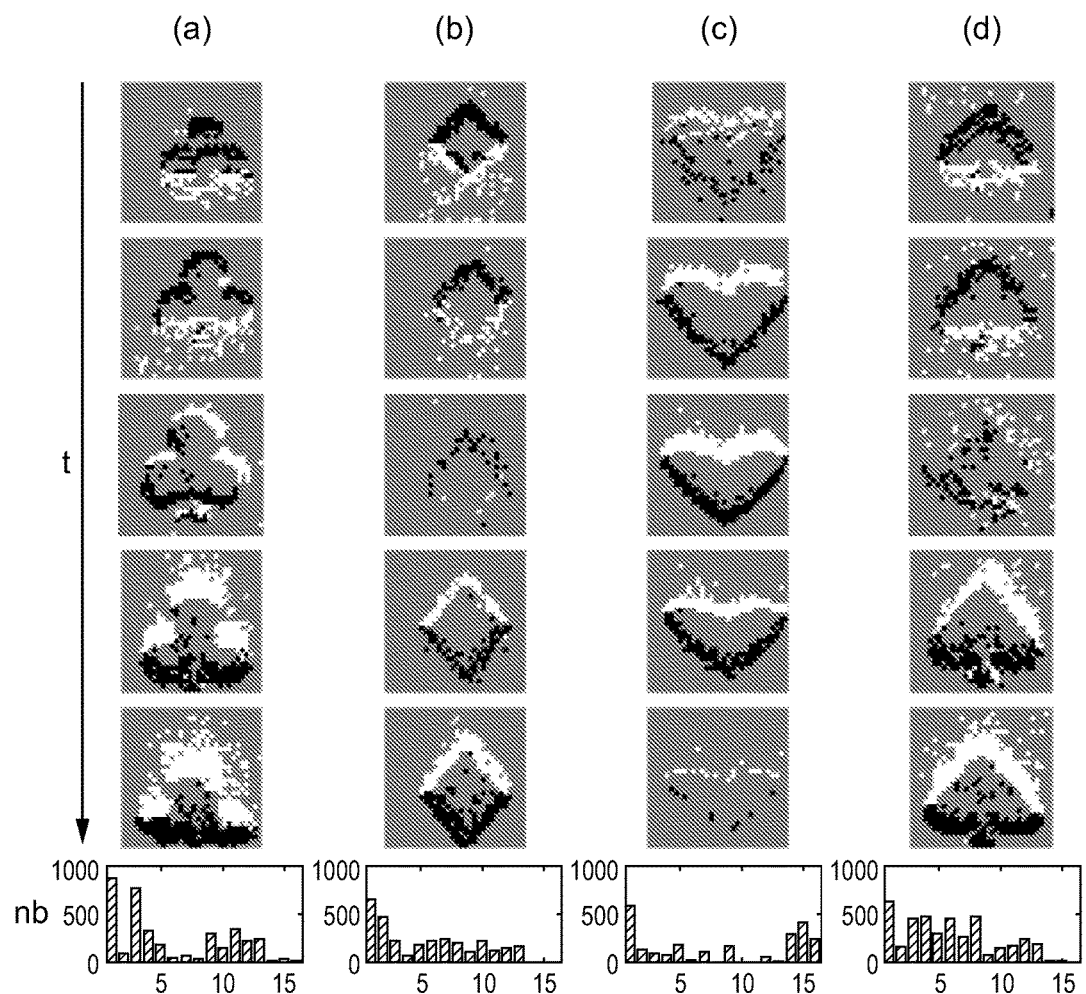
FIG. 4 shows the occurrence of events in the stream of events when playing cards are returned.

For the purposes of illustration, FIG. 4 shows the occurrence of "ON" events (white points) and "OFF" events (black points) when playing cards that comprise a club, a diamond, a heart, and a spade are returned. The histograms respectively associated with each one of the stream of events (a), (b), (c) and (d) are also displayed below these streams of events: these histograms form a sort of "signature" of the shapes to be recognised in the stream of events.

It is possible to construct these histograms during a predetermined number of trainings (i.e. generation of histograms by the presentation of stream of events that represent the same shape): as such, it is possible to determine a "typical histogram" by averaging the histograms obtained during the training for the same shape and/or the same movement.

Once these typical histograms are determined, it is then possible to again determine a current histogram from a stream of events and to compare this histogram with the typical histograms determined during the training phase.

The typical histogram that has the closest distance with the current histogram can then make it possible to identify the shape that corresponds to the stream of events.

It is furthermore possible that the k-closest histograms types be returned (possibly with a score corresponding to their proximity).

The distance between two histograms $\mathcal{H}_1$ and $\mathcal{H}_2$ can be calculated as a mathematical distance between two vectors that have for coordinates the numbers of occurrences for each one of the typical contexts:

$$d(\mathcal{H}_1; \mathcal{H}_2) = \|\mathcal{H}_1 - \mathcal{H}_2\|$$

It is also possible to calculate a standardised distance as follows:

$$d^N(\mathcal{H}_1; \mathcal{H}_2) = \left\| \frac{\mathcal{H}_1}{\text{card}(\mathcal{H}_1)} - \frac{\mathcal{H}_2}{\text{card}(\mathcal{H}_2)} \right\|$$

with card($\mathcal{H}_j$) the number of typical contexts (i.e. vertical bar) of the histogram $\mathcal{H}_j$.

The Bhattacharyya distance can also be used as a replacement for the conventional distance:

$$d^B(\mathcal{H}_1; \mathcal{H}_2) = -\ln \sum_i \left( \left\| \frac{\mathcal{H}_1(i)}{\text{card}(\mathcal{H}_1)} \cdot \frac{\mathcal{H}_2(i)}{\text{card}(\mathcal{H}_2)} \right\| \right)$$

with $\mathcal{H}_j(i)$ the number of occurrences of the $i^{th}$ typical context of the histogram $\mathcal{H}_j$.

Any other mathematical distance can also be used.

Then, it is possible to consider that the shape that corresponds to the associated typical histogram has occurred in the stream of events.

Thanks to this typical histogram, a shape recognition is as such possible.

Figure 5:
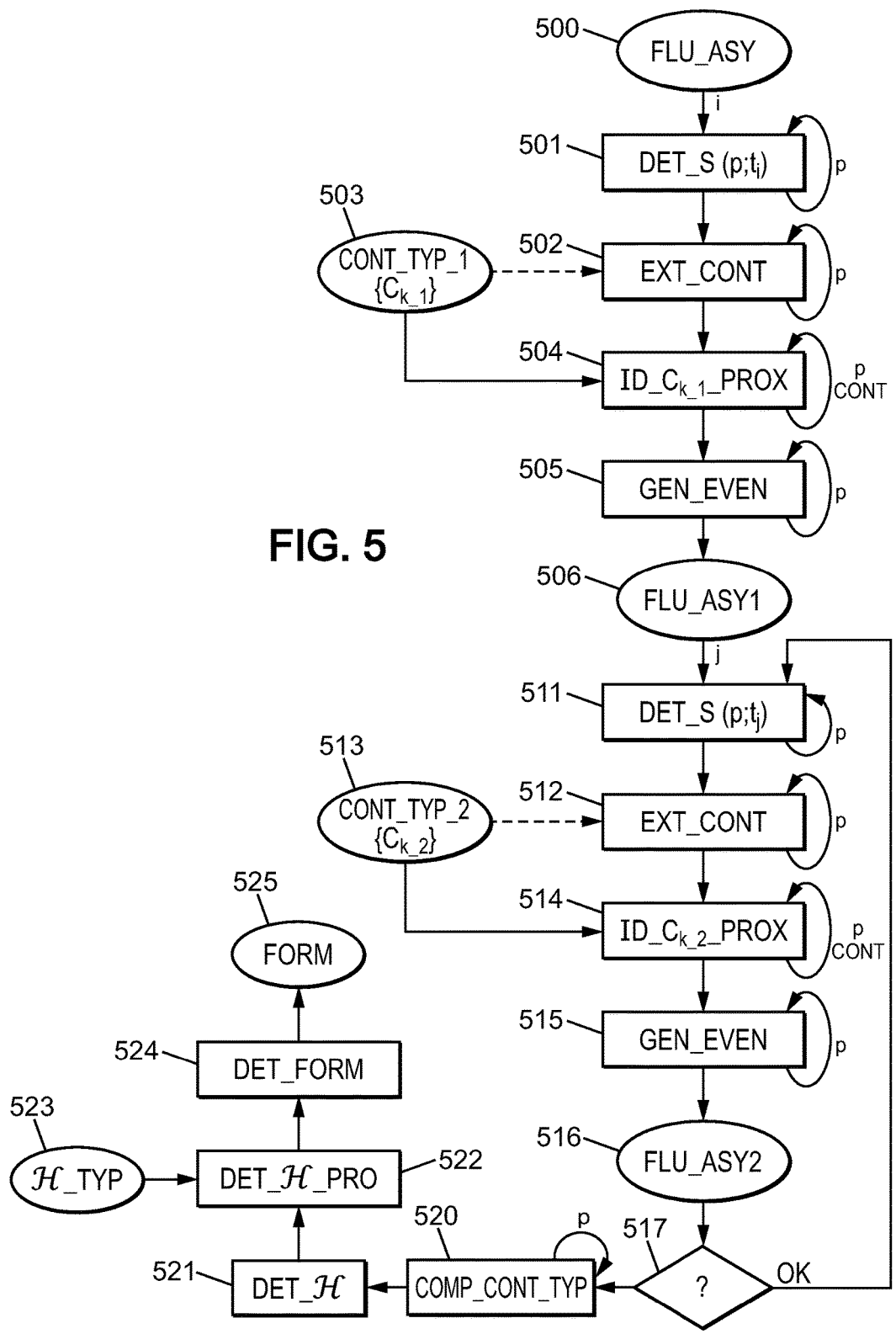
FIG. 5 is an example of a flowchart of a possible embodiment of the invention.

FIG. 5 is an example of a flowchart of a possible embodiment of the invention.

Upon reception of an event i of an event stream 500 coming from an asynchronous sensor and associated with time $t_i$, it is possible to determine or to update (step 501) the values of $S(p, pol, t_i)$ for each pixel p of the sensor and for each value of pol, as is indicated hereinabove: this step makes it possible to create or to update the "freshness" card of the sensor.

For the step 501, the time constant used for the decrease of the primitive function of S is noted as $\tau_1$. As such, we can, for example, have:

$$S(p, pol, t_i) = h \cdot e^{-\frac{t_i - T(p, pol, t_i)}{\tau_1}}$$

Once this determination is carried out, it is possible, for each pixel p of the sensor, to extract a context $S_p$ (step 502) from the freshness card previously calculated in the step 501: this extraction makes it possible to isolate certain values of $S(q, pol, t_i)$ for the pixels q with a spatial proximity $N_p$ to the pixel p considered and for a given polarity value pol. For the purposes of illustration, $N_{p\_1}$ can define a square or a rectangle centred around the spatial position p considered. The spatial proximity $N_{p\_1}$ can be defined so that the contexts extracted as such are of dimensions equal to the dimensions of the typical contexts of the first hierarchical level 503 ($C_{k\_1}$), in order to be compared with the latter.

For the purposes of illustration, FIG. 6a shows a first hierarchical level of possible typical contexts (i.e. size 5×5 pixels for a polarity of 1 (left zone of each one of the typical contexts) or for a polarity of −1 (right zone of each one of the typical contexts)).

Comparing the determined context $S_{p\_1}$ and associated with the pixel p with the possible typical contexts $\{C_{k\_1}\}$ of the first hierarchical level makes it possible to identify the typical context that is closest to $S_{p\_1}$ (step 504) as indicated hereinabove.

This identification of the closest typical context $C_{k\_1prox}$ among the possible typical contexts $\{C_{k\_1}\}$ of the first hierarchical level makes it possible to generate, for the pixel p, an event $ev_1$ that indicates the typical context associated with this pixel p (step 505):

$$ev_1(p) = \begin{cases} t \\ C_{k\_1prox} \end{cases}$$

with t the current time.

If no closest typical context is identified (see supra), no event is generated.

Generating these events $ev_1(p)$ also forms an asynchronous stream of events (506).

Then, it is possible to process these events 506 in a manner similar to the events 500 coming from the sensor.

As such, upon reception of each event j of the event stream 506 and associated with time $t_j$, it is possible to determine or to update (step 511) the values of a new "freshness" card (i.e. carte for the second hierarchical level) having as a value $(p,pol) \rightarrow S_2(p,pol,t_j)$ for each pixel p of the sensor and for each value of pol (knowing that for this step 511 the values of pol are representative of the typical context identified during the step 504 for the first hierarchical level, i.e. 4 typical contexts possible in the framework of FIG. 6a, with each typical context having two polarities), such as in indicated hereinabove.

For the step 511, the time constant used for the decrease of the primitive function is noted as $\tau_2$ with $\tau_2 \geq \tau_1$. As such, we can, for example, have:

$$S_2(p, t_j) = h.e^{-\frac{t_j - T(p,t_j)}{\tau_2}}$$

Once this determination has been carried out, it is possible, for each pixel p of the sensor, to extract a context $S_{p\_2}$ (step 512) from the freshness card calculated hereinabove in the step 511: this extraction makes it possible to isolate certain values of $S_2(q, pol, t_j)$ for the pixels q with a spatial proximity $N_{p\_2}$ to the pixel p considered and for a given polarity value pol. For the purposes of illustration, $N_{p\_2}$ can define a square or a rectangle centred around the spatial position p considered. The spatial proximity $N_{p\_2}$ can be defined so that the contexts extracted as such are of dimensions equal to the dimensions of the typical contexts of the second hierarchical level 513 ($C_{k\_2}$), in order to be compared to the latter.

Figure 6B:
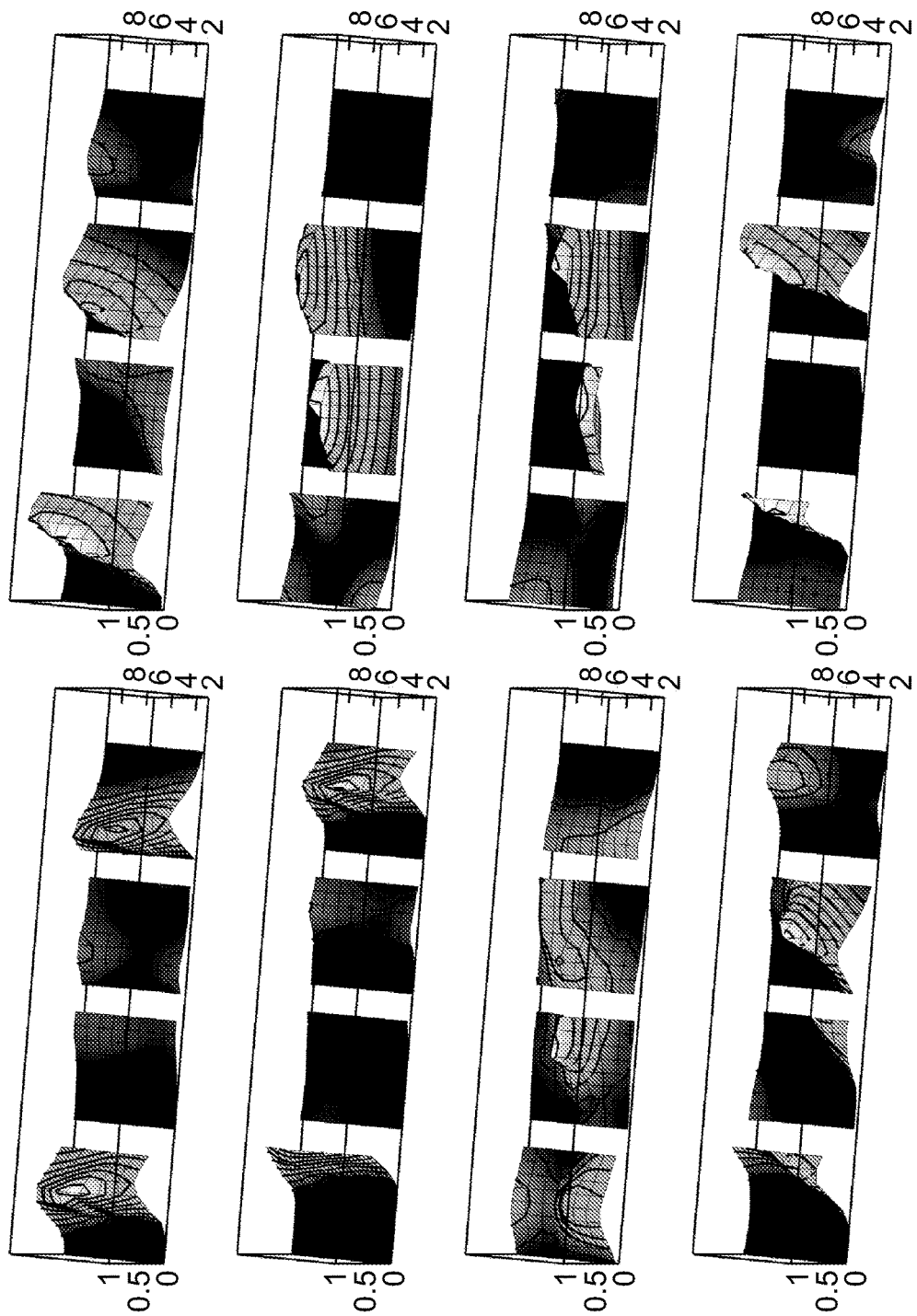

For the purposes of illustration, FIG. 6b shows a second hierarchical level of eight possible typical contexts.

If each typical context of the first hierarchical level has two zones (one zone for the events of polarity −1 (OFF) and a zone for the events of polarity 1 (ON), see FIG. 6a), the typical contexts of the second hierarchical level have as many zones (i.e. 4) as typical contexts in the immediately lower hierarchical level (i.e. the first hierarchical level, here, see FIG. 6b).

Moreover, the typical contexts of the second hierarchical level can be such that the spatial proximity $N_{p\_2}$ defines a zone that is larger than the one defined by the spatial proximity $N_{p\_1}$ (e.g. if $N_{p\_1}$ is defined by a square of side $2R_1+1$ then $N_{p\_2}$ can be defined by a square of side $2R_2+1$ with $R_2 \geq R_1$).

Comparing the determined context $S_{p\_2}$ and associated with the pixel p with the possible typical contexts $\{C_{k\_2}\}$ of the first hierarchical level makes it possible to identify the typical context that is closest to $S_{p\_2}$ (step 514) as indicated hereinabove.

This identification of the closest typical context $C_{k\_2prox}$ among the possible typical contexts $\{C_{k\_2}\}$ of the second hierarchical level makes it possible to generate, for the pixel p, an event $ev_e$ that indicates the typical context associated with this pixel p (step 515):

$$ev_2(p) = \begin{cases} t \\ C_{k\_2prox} \end{cases}$$

with t the current time.

If no closest typical context is identified (see supra), no event is generated.

Generating these events $ev_2(p)$ also forms an asynchronous stream of events (516).

Then, it is possible to process these events 516 in a manner similar to the events 506: if a higher hierarchical level exists (test 517, output OK, for example the hierarchical level of level three represented by FIGS. 6c (6(c)(1) and 6(c)(2))), it is possible to reiterate the steps 511 to 515 by taking as input the events generated by the immediately lower hierarchical level and by using the typical contexts of this upper hierarchical level (see 513).

If there is no upper hierarchical level, it is possible to count the number of occurrences of the typical contexts (513) identified for all of the pixels p and for a fixed time t. As explained hereinabove, this counting allows for the determination of a histogram $\mathcal{H}$ that represents the number of occurrences of the typical contexts identified (step 521).

Using the histograms determined in the step 513, it is then possible to calculate a distance between typical histograms (523) that represent shapes and/or movements, and as such determine the closet typical histogram (step 522).

Thanks to this typical histogram determined, it is possible to determine the shape and/or the movement associated with the latter (step 524) and as such return this shape and/or this movement (525).

Of course, if the flowchart of FIG. 5 shows the execution of the steps 520 to 524 after the analysis of at least one second hierarchical level of typical contexts, these steps 520 to 524 can entirely be executed after the steps 501 to 505 (i.e. with the analysis of a single hierarchical level).

Figure 7:
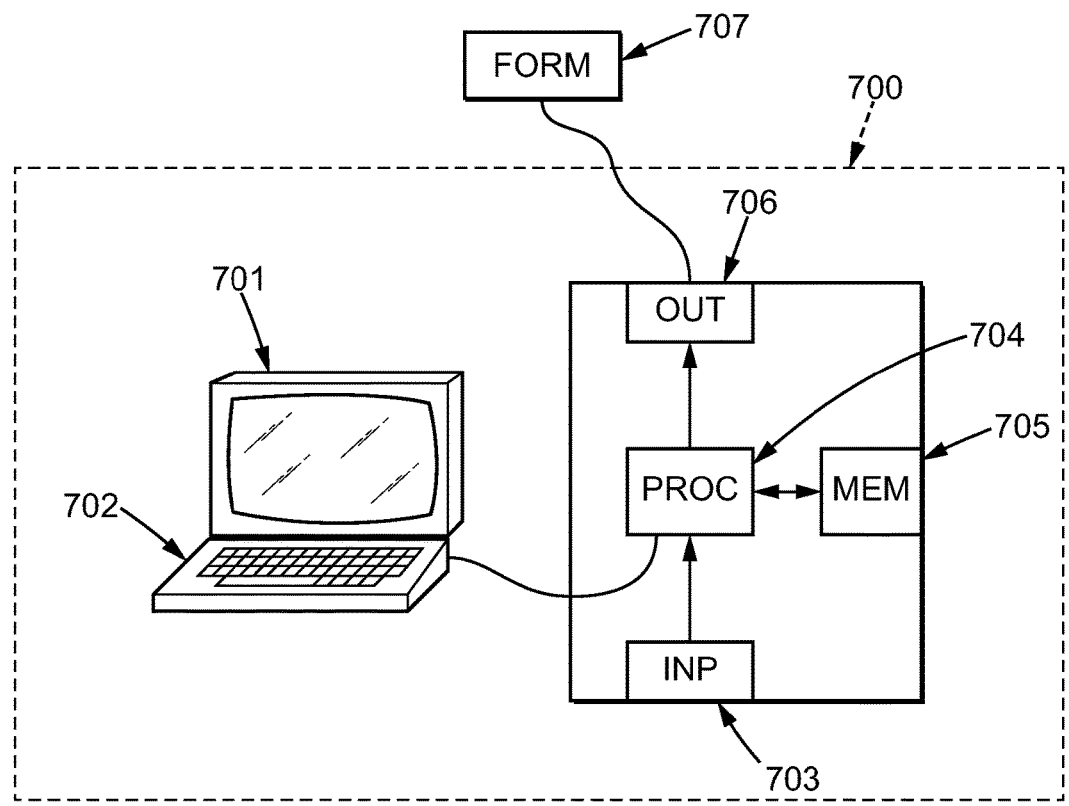
FIG. 7 shows a device for the implementation of an embodiment according to the invention.

FIG. 7 shows a device for the implementing of an embodiment according to the invention.

In this embodiment, the device comprises a computer 700, comprising a memory 705 for storing instructions that allow for the implementation of the method, the data concerning the stream of events received, and temporary data for performing the various steps of the method such as described hereinabove.

The computer further comprises a circuit 704. This circuit can be, for example:
- a processor able to interpret instructions in the form of a computer program, or
- an electronic card of which the steps of the method of the invention are described in the silicon, or
- a programmable electronic chip such as a FPGA chip (Field-Programmable Gate Array).

This computer comprises an input interface 703 for receiving events from sensors, and an output interface 706 for the supplying of shapes 707 identified in the event stream. Finally, the computer can comprise, in order to allow for easy interaction with a user, a screen 701 and a keyboard 702. Of course, the keyboard is optional, in particular in the framework of a computer that has the form of a touch-sensitive tablet, for example.

Figure 8A:
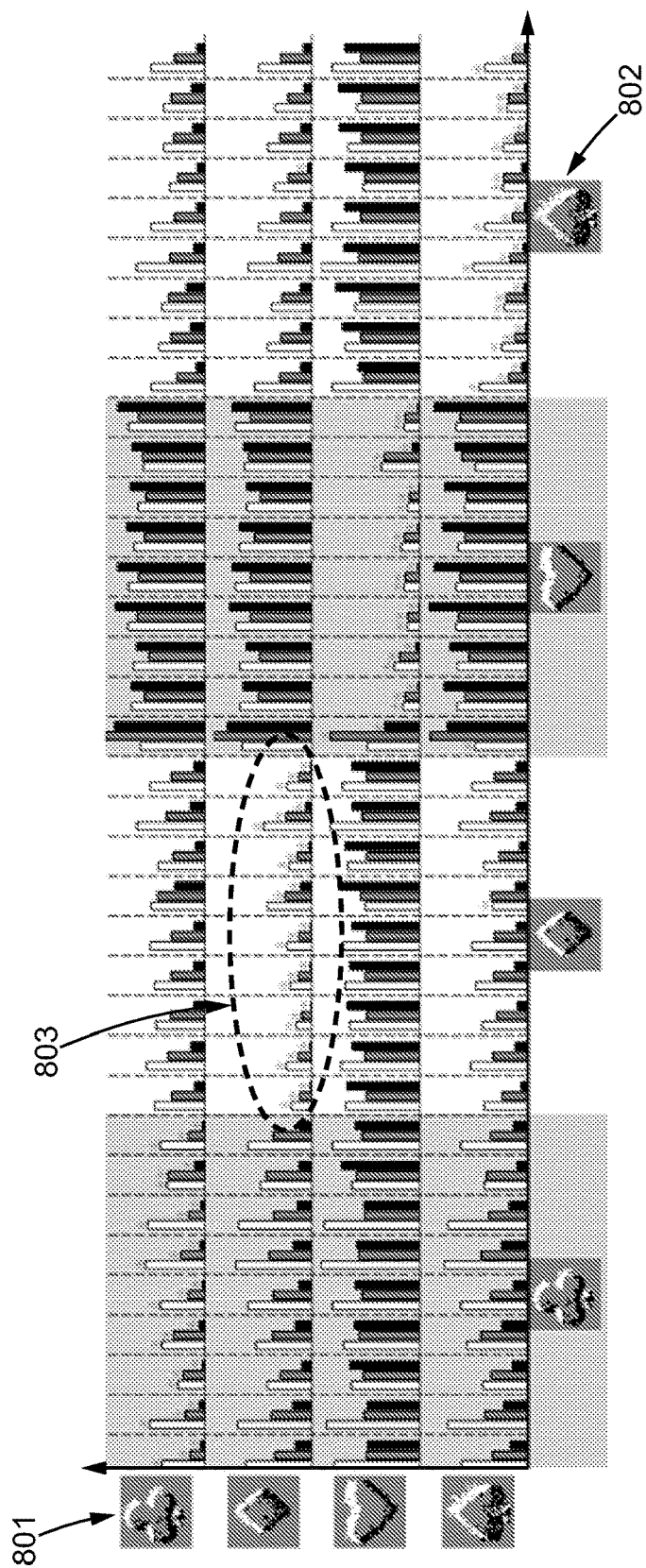

FIG. 8a is a performance example of the detection of shapes (club, diamond, heart, and spade).

Each line (see ordinate 801) corresponds to the data concerning a particular shape that has been learned (i.e. typical histogram, see supra).

Each column (see abscissa 802) corresponds to the data concerning a particular shape that has to be recognised (i.e. histogram to be recognised).

The intersection of a line and of a column (corresponding to the set 803, for example) makes it possible to view the distance of the typical histogram with the histogram to be recognised for several presentations of the shape (here, 9 presentations of the shape, these presentations are separated by a dotted vertical line):
- the white bar (left bar) corresponds to a conventional distance;
- the grey bar (middle bar) corresponds to a standardised distance;
- the black bar (right bar) corresponds to a Bhattacharyya distance.

The three distances (respectively conventional, standardised, and Bhattacharyya) represented as such have a respective performance of 94%, 100% and 97% for these shapes.

Figure 8B:
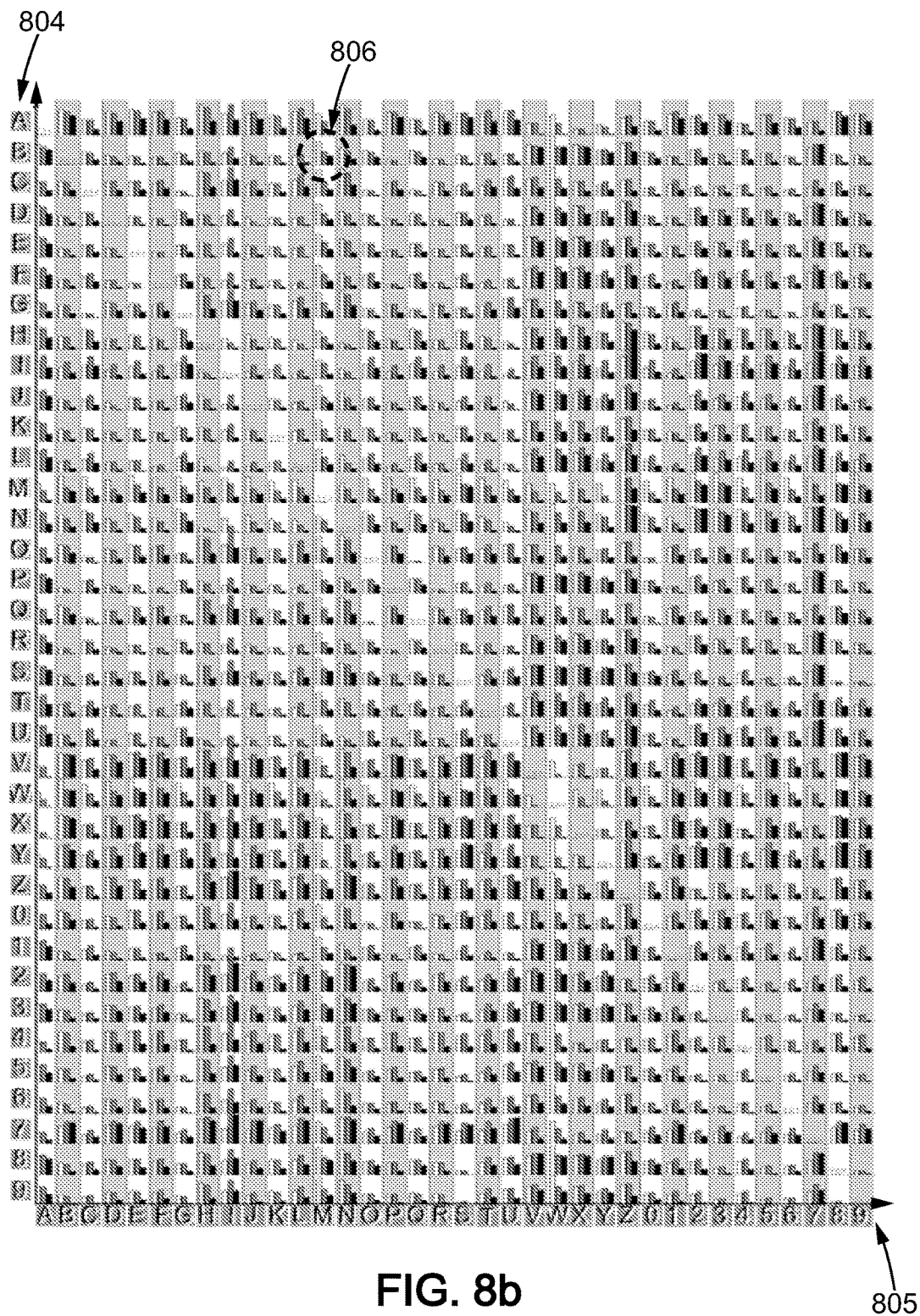

FIG. 8b is a performance example of the detection of shapes (digits and capital letters).

Each line (see ordinate 804) corresponds to the data concerning a particular shape that has been learned (i.e. typical histogram, see supra).

Each column (see abscissa 805) corresponds to the data concerning a particular shape that has to be recognised (i.e. histogram to be recognised).

The intersection of a line and of a column (corresponding to the set 806, for example) makes it possible to view the distance of the typical histogram with the histogram to be recognised for a presentation of the shape:
- the white bar (left bar) corresponds to a conventional distance;
- the grey bar (middle bar) corresponds to a standardised distance;
- the black bar (right bar) corresponds to a Bhattacharyya distance.

The three distances (respectively conventional, standardised, and Bhattacharyya) represented as such all have a performance of 100% for these shapes.

FIG. 8c is a performance example of the detection of shapes (faces).

Each table (807, 808 and 809) presents the number occurrences of recognition of a face presented (abscissa) using a learned face (ordinates) for 19 presentations of this face.

The table 807 uses a conventional distance to carry out the face recognition (recognition rate: 37%).

The table 808 uses a standardised distance to carry out the face recognition (recognition rate: 78%).

The table 808 uses a Bhattacharyya distance to carry out the face recognition (recognition rate: 79%).

Moreover, the functional diagram shown in FIG. 5 is a typical example of a program of which certain instructions can be carried out with the device described. As such, FIG. 5 can correspond to the flow chart of the general algorithm of a computer program in terms of the invention.

Of course, this invention is not limited to the embodiments described hereinabove as an example; it extends to other alternatives.

Other embodiments are possible.

For example, the typical contexts of FIGS. 6a to 6c can be of any dimensions whatsoever.

Moreover, the description mainly mentions sources of events coming from a light/video sensor. However, the invention described is generalised to any set of sources of events such as for example a network of pressure sensors that would function over such an asynchronous mode and of which the spatial arrangement would be similar to a video sensor.

The invention claimed is:

1. A method for recognising shapes in an asynchronous signal produced by a light sensor, the sensor having a pixel matrix disposed opposite a scene, the method comprising:
   /a/ processing an asynchronous signal by carrying out steps of:
   receiving from the light sensor the asynchronous signal comprising, for each pixel of the matrix, successive events from said pixel, and
   analysing the asynchronous signal using activity profiles as events are received in the asynchronous signal;
   /b/ as events are received, for each current pixel of said sensor:
   /b1/ determination of a context for said current pixel, said context being defined as a set of activity profiles of pixels located less than a predetermined distance from said current pixel, and
   /b2/ determination of a typical context from a set of predetermined typical contexts, with the typical context determined having, from the set of typical contexts, a minimum distance to the context determined in the step /b1/;
   /c/ determination of a signature as a function of a number of occurrences of determination of typical contexts in the step /b2/; and
   /d/ determination of a shape through a comparison of said signature with a base of signature types,
   wherein the activity profile comprises at least, for each pixel of the sensor, an activity value that decreases as a function of the time that has passed since a most recent event among the successive events from said pixel.

2. The method according to claim 1, wherein the activity profile decreases exponentially as a function of time that has passed since the most recent event among the successive events from said pixel.

3. The method according to claim 2, wherein the activity profile is furthermore as a function of time that has passed since an event prior to the most recent event among the successive events from said pixel.

4. A non-transitory computer-readable medium having stored thereon a computer program comprising instructions that, upon execution by a processor of a computer, cause the computer to implement the method according to claim 2.

5. The method according to claim 1, wherein the activity profile is furthermore as a function of time that has passed since an event prior to the most recent event among the successive events from said pixel.

6. A non-transitory computer-readable medium having stored thereon a computer program comprising instructions that, upon execution by a processor of a computer, cause the computer to implement the method according to claim 5.

7. The method according to claim 1, wherein the determination of a context takes into account, separately, the events having different polarities.

8. A non-transitory computer-readable medium having stored thereon a computer program comprising instructions that, upon execution by a processor of a computer, cause the computer to implement the method according to claim 7.

9. A non-transitory computer-readable medium having stored thereon a computer program comprising instructions that, upon execution by a processor of a computer, cause the computer to implement the method according to claim 1.

10. A method for recognising shapes in an asynchronous signal produced by a light sensor, the sensor having a pixel matrix disposed opposite a scene, incorporating a hierarchical model of typical contexts being defined, each typical context being associated with a plurality of levels of the hierarchical model, comprising:
    /a/ usage of events of the asynchronous signal of the sensor as current events and usage of typical contexts of the first level of the hierarchical model as current type contexts;
    /b/ processing an asynchronous signal with the current events, including:
        receiving from the light sensor the asynchronous signal comprising, for each pixel of the matrix, successive events from said pixel, and
        analysing the asynchronous signal using activity profiles as events are received in the asynchronous signal;
    /c/ as current events are received, for each current pixel of said sensor:
        /c1/ determination of a context for said current pixel, with the said context being defined as a set of activity profiles used in the step /b/ for pixels located less than a predetermined distance from said current pixel,
        /c2/ determination of a typical context from the current typical contexts, with the determined typical context having, among all of the current typical contexts, a minimum distance to the context determined in the step /c1/, and
        /c3/ generation of an event as a function of the typical context identified in the step /c2/;
    /d/ if a level of the hierarchical model has not been used:
        usage of the events generated in the step /c3/ as current events,
        usage of the typical contexts of a level of the hierarchical model not yet used as current typical contexts, and
        re-execution of the steps /b/ to /e/; and
    /e/ if all of the levels of the hierarchical model have been used:
        determination of a signature as a function of a number of occurrences of determination of typical contexts at the last occurrence of the step /c2/, and
        determination of a shape through a comparison of said signature with a base of typical signatures,
    wherein the activity profile comprises at least, for each pixel of the sensor, an activity value that decreases as a function of the time that has passed since a most recent event among the successive events from said pixel.

11. The method according to claim 10, wherein the comparison of the step /e/ comprises the calculation of a Bhattacharyya distance.

12. A non-transitory computer-readable medium having stored thereon a computer program comprising instructions that, upon execution by a processor of a computer, cause the computer to implement the method according to claim 11.

13. The method according to claim 10, wherein the comparison of the step /e/ comprises the calculation of a standardised distance.

14. The method according to claim 10, wherein the determination of a context takes into account, separately, the events having different polarities.

15. A non-transitory computer-readable medium having stored thereon a computer program comprising instructions that, upon execution by a processor of a computer, cause the computer to implement the method according to claim 14.

16. A non-transitory computer-readable medium having stored thereon a computer program comprising instructions that, upon execution by a processor of a computer, cause the computer to implement the method according to claim 10.

17. The method according to claim 10, wherein the activity profile decreases exponentially as a function of time that has passed since the most recent event among the successive events from said pixel.

18. A non-transitory computer-readable medium having stored thereon a computer program comprising instructions that, upon execution by a processor of a computer, cause the computer to implement the method according to claim 17.

19. The method according to claim 10, wherein the activity profile is furthermore as a function of time that has passed since an event prior to the most recent event among the successive events from said pixel.

20. A non-transitory computer-readable medium having stored thereon a computer program comprising instructions that, upon execution by a processor of a computer, cause the computer to implement the method according to claim 19.

* * * * *